Nov. 26, 1968  G. W. MEADOWS  3,413,392
HOT PRESSING PROCESS
Filed Oct. 17, 1966  3 Sheets-Sheet 1
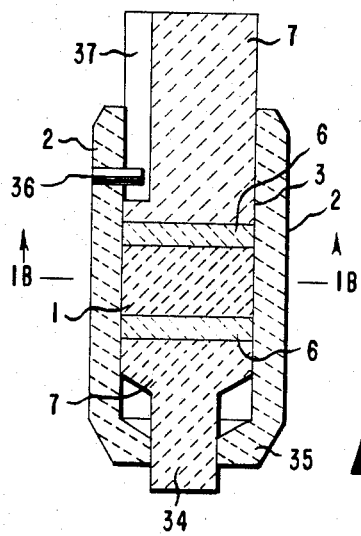
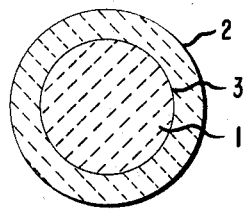
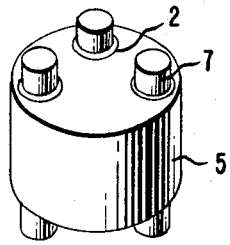
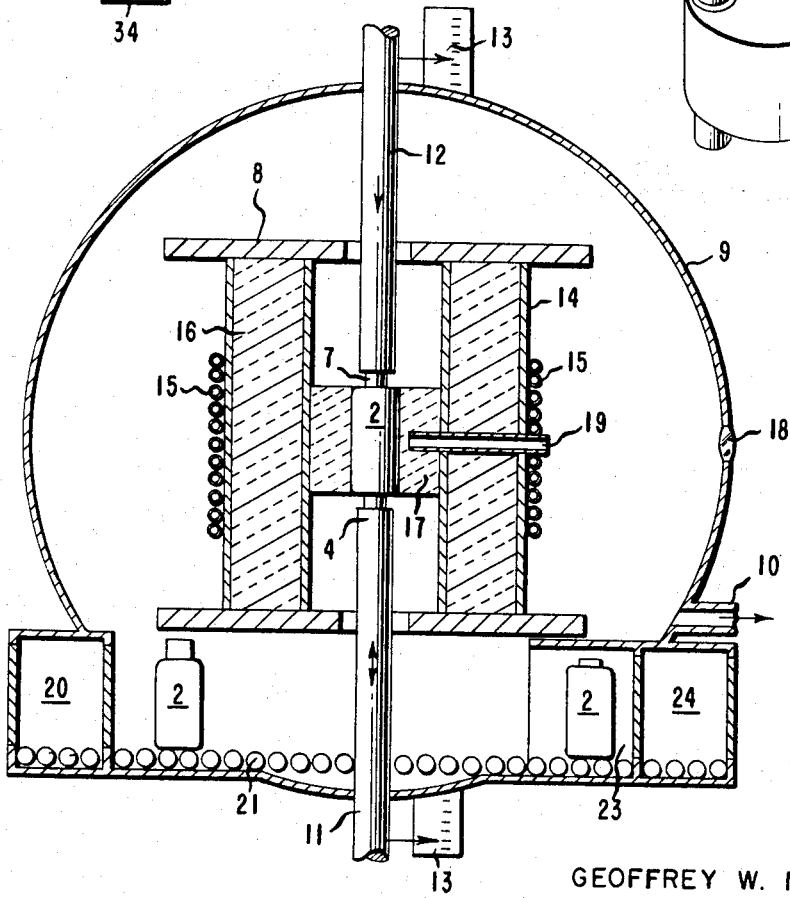
INVENTOR
GEOFFREY W. MEADOWS
BY
Lynn N Fisher
ATTORNEY Nov. 26, 1968   G. W. MEADOWS   3,413,392
HOT PRESSING PROCESS
Filed Oct. 17, 1966   3 Sheets-Sheet 2

INVENTOR
GEOFFREY W. MEADOWS

BY

ATTORNEY

INVENTOR
GEOFFREY W. MEADOWS

_United States Patent Office_

3,413,392
Patented Nov. 26, 1968

3,413,392
HOT PRESSING PROCESS
Geoffrey W. Meadows, Kennett Square, Pa., assignor to
E. I. du Pont de Nemours and Company, Wilmington,
Del., a corporation of Delaware
Continuation-in-part of application Ser. No. 500,609,
Oct. 22, 1965. This application Oct. 17, 1966, Ser.
No. 594,643
5 Claims. (Cl. 264—102)

ABSTRACT OF THE DISCLOSURE

Oxygen-sensitive refractory materials are rapidly hot-pressed by a repetitive procedure in which a refractory material is loaded into reusable shells. The loaded shells positioned in a repetitive sequence are introduced into a housing containing an atmosphere essentially free of oxygen, in turn positioned in a preheated susceptor and heated to from 500 to 2500° C. When the refractory material has reached the desired temperature, a pressure of from 200 to 30,000 pounds per square inch is applied for a sufficient time to compact the refractory material to at least 95% of theoretical density. The shell is then immediately withdrawn from the susceptor and the refractory material is rapidly cooled in an atmosphere essentially free of oxygen, before or after being removed from the shell.

---

Figure 3:
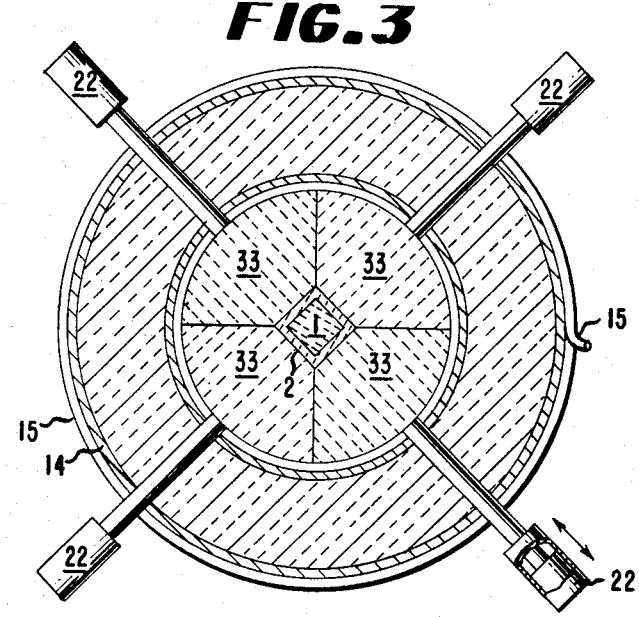

This application is a continuation-in-part application of my copending application Ser. No. 500,609, filed Oct. 22, 1965, now abandoned.

This invention relates to the forming of refractory solids by hot pressing. More particularly, the invention is directed to methods for the rapid and repetitive hot pressing of refractory materials under controlled conditions, in the absence of oxygen, to essentially their maximum theoretical density.

Hot pressing has not usually been economically competitive with other processes for fabricating high density metallic and refractory bodies in industrial quantities. Various other forming methods, e.g. cold pressing and sintering, have been favored since they have required shorter process times per unit processed and can be conducted on a continuous basis. However, hot pressing is a preferred process since it can yield completely dense products where as sintered products often contain residual porosity.

The rapid, hot-pressing process of this invention involved the following operations performed in a repetitive sequence:

(a) Loading an oxygen sensitive refractory material in a reuseable shell made of refractory material and, optionally, preheating the loaded shell, (b) Introducing the loaded shell into a heated susceptor situated in a hot press, the press preferably having two movable pressing means, (c) Maintaining the hot press in an atmosphere essentially free from oxygen, (d) Heating the loaded shell to a temperature between about 500° and 2500° C., (e) Applying a pressure between 200 to 10,000 pounds per square inch to the refractory material within the shell, the heat and pressure being programmed for a period of time to achieve the desired compaction, i.e., at least 95% of the theoretical density, (f) Immediately withdrawing the loaded shell from the susceptor before the compacted material has a chance to cool substantially, and in either order, (g) Cooling the shell and compacted material in an atmosphere essentially free from oxygen, and (h) Removing the compacted refractory material from the shell, the shell being reuseable in the process. While the loaded shell is cooling as set forth in step (g), another shell, having been loaded, can be introduced into the hot press to compact its contents to the desired density.

In the process, steps (g) and (h) can be performed in either order. Thus the shell can be cooled with the compacted material remaining inside, the material subsequently being removed from the shell. In the alternative embodiment, the compacted material can be ejected from the shell while hot, and then cooled in the oxygen free atmosphere.

In many embodiments of the process of the invention, depending upon the refractory work material involved and the pressing parameters, it will be desirable to perform all the steps in the absence of oxygen. The oxygen free environment can be obtained by locating the equipment within a sealed housing and maintaining a vacuum or an inert gas atmosphere within the housing.

Optimum temperatures, pressures and times of application can be programmed for each material to be formed in the hot press. The heat and pressure can be applied simultaneously or in the particular order desired depending upon the refractory material involved and the characteristics desired for the compacted product.

The process of the invention through the use of a reuseable refractory shell containing the refractory material to be compacted provides an economical and continuous method of hot pressing. The use of the reuseable shell permits the rapid introduction and removal of many samples of refractory material into the hot press in sequence, and without interruption. This is accomplished since the loaded shell can be inserted into a preheated susceptor and rapidly heated, and more importantly, the shell can be removed from the heated susceptor in the hot press without cooling, thus freeing the hot press for another shell. The entire operation within the press for each sample can be carried out in a few minutes rather than hours as was often the case in prior art processes.

Figure 4:
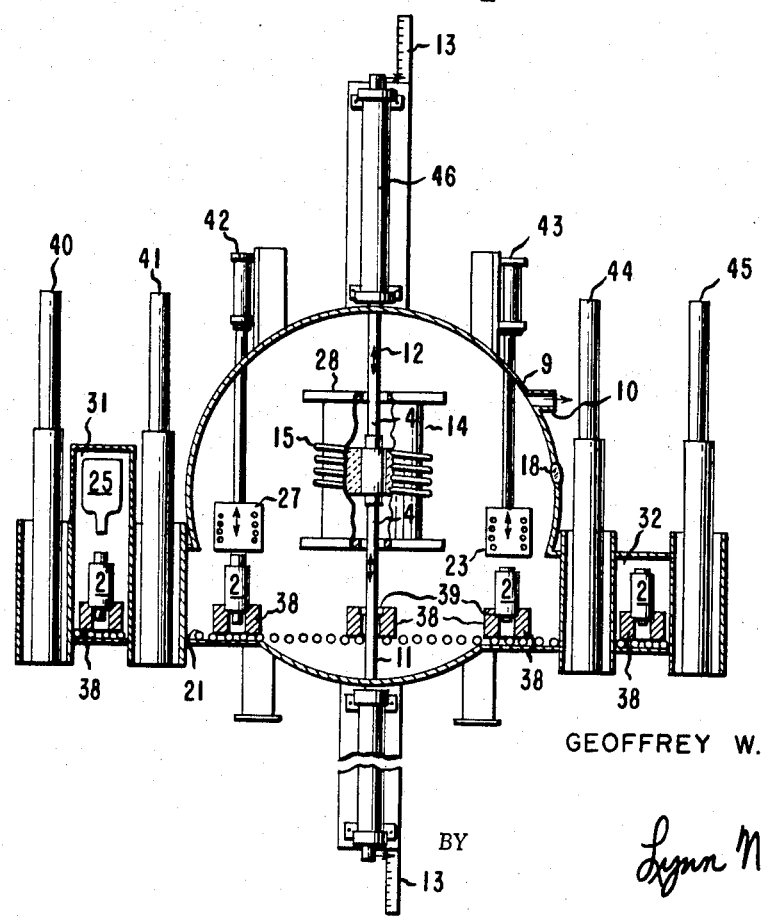

The process of the invention will further be described with reference to the following drawings in which:

FIG. 1A is a vertical-sectional view of a loaded shell prior to being inserted into a hot press, FIG. 1B is a cross-sectional view along line 1B—1B of FIG. 1A, FIG. 1C is an isometric view of a shell container supporting a plurality of shells, FIG. 2 is an elevation with parts in section, of a hot press useful in the process of the invention; the press containing a shell in position for the application of heat and pressure, FIG. 3 is a horizontal, cross-sectional view of the interior of a hot press containing a sectioned susceptor, FIG. 4 is a plan view with parts in section, of a completely enclosed hot press and auxiliary equipment.

Figure 5:
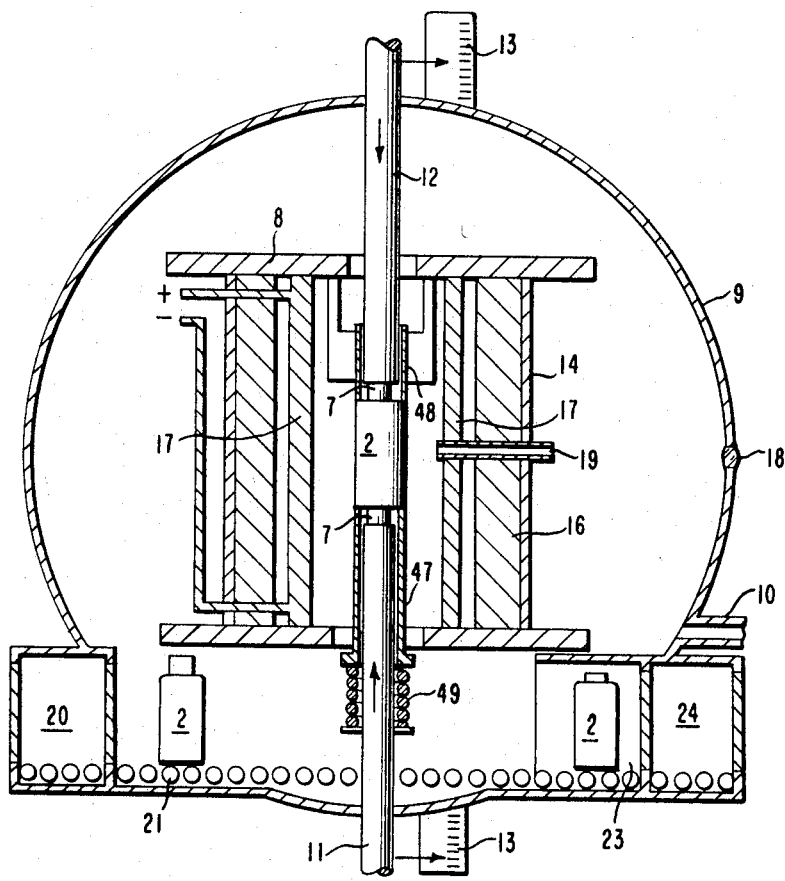

FIG. 5 is an elevation with parts in section, of another embodiment of the hot press useful in the process of the invention.

The process of the invention can be applied to a variety of refractory raw materials, i.e. oxides, nitrides, carbides, borides, silicides, beryllides, sulfides and mixtures thereof and these materials bonded with metals, e.g. tungsten carbide bonded with cobalt. The process is particularly useful in compacting tungsten carbide, silicon carbide, aluminum oxide, tantalum carbide, titanium carbide and mixtures thereof when these materials are bonded with metals, e.g. cobalt, nickel, nickel-molybdenum alloys, and the like. Prior to loading, the refractory raw material can be in powdered form, in pre-compacted, or in solid billet form.

Referring to FIG. 1A, a sample of refractory material 1 to be compacted is loaded into a cylindrical shell 2. With some refractory raw materials, i.e. reactive refractory powders, the loading operation will have to be performed in an atmosphere essentially free from oxygen. The refractory material 1 is confined within this embodiment and assumes the shape of the shell cavity 3. The shape and dimensions of the shell cavity and the amount of material loaded within it can determine the final dimensions of the pressed mass. However, the basic function of the shell is to serve as a container for the material to be hot pressed, and it is not necessarily a molding chamber. The size of the pressed mass is not critical, but the shapes more frequently used have a diameter of ⅛ to 3½ inches and a thickness of ⅛ to 3 inches or more.

The cross section of the shell cavity 3 (see FIG. 1B) can be either regular or irregular, or it can be made to form any shape desired for the finished body. Thus it can be circular, triangular, rectangular, polygonal, oval, with grooves and ribs, etc. It can be tapered from one end to the other, and if the finished body is to be hollow, it can contain a core.

The cross section of the shell 2 itself can also be almost any shape; however, it will generally be circular or square; the circular cross section being preferred since it gives greater strength than the other shapes, and a non-distorting shell is desired. The wall thickness of the shell is not critical and is related to the diameter of the piece being pressed and the pressure to be applied. The wall thickness must be such that it supports the pressure to be applied; thus as the diameter of the piece being pressed or the applied pressure are increased, the wall thickness must be increased. The relationship between the variable is not direct, but can readily be calculated by those skilled in the art.

The shell can be made of any of many refractory construction materials which have good strength at high temperatures such as alumina, zirconia, beryllia, silicon carbide, boron nitride, boron carbide, zirconium carbide, molybdenum, tungsten, tungsten carbide, titanium carbide, tantalum carbide, titanium diboride, but it is preferably made of graphite. The material selected depends upon the pressures and temperatures that will be encountered during the pressing operation, and the size of the parts subjected to the pressure.

Thin end discs or plugs 6 are placed into the shell cavity 3 on top and bottom of the material 1 to be pressed; the bottom disc normally having been placed into the cavity prior to loading the material. These discs are made of a refractory material, such as set forth above, but preferably graphite, and have a close fit with the walls of the shell cavity. Pistons 7 are then loaded in both ends of the shell, the pistons also having a close fit with the cavity walls. When properly loaded, one end of the piston 7 is in contact with the discs 6 and the other end protrudes from the shell.

Under some circumstances, e.g. when the loaded shell is transported while in a vertical position, it may be desirable that suitable means be present to prevent the pistons 7 from falling out of the shell 2. This can be accomplished by providing the lower part 34 of the piston with a smaller cross section than the part of the piston adjacent the end plugs 6. The smaller portion can move in and out of the shell, while a rib 35 around the bottom of the shell cavity 3 would limit the downward movement of the larger section of the piston and maintain the piston within the shell.

Alternatively, the pistons may be retained within the shell by pin and slot means. Thus a shearable pin 36 could be fitted into a suitable hole in the shell and extend through into a slot 37 in the piston. The slot running from the outer end of the piston to a point near the inner end.

In an alternative loading procedure, the refractory material 1 can be placed in the shell cavity 3 in a series of layers separated by non-reactive spacers (not shown) of another refractory material. With this loading, a number of separate pieces can be pressed in one pressing operation.

Also in order to increase the capacity, it is possible to use a shell container 5 as illustrated in FIG. 1C. In this embodiment, a plurality of loaded refractory shells 2 are inserted into closely fitting cavities in the container; the container also being made of a suitable refractory material.

The loaded shell can be handled with the material 1 within essentially loosely packed, or if desired, 200 to 400 pounds per square inch can be applied to the pistons 7 to give a more compacted refractory sample for ease of handling. At this time, optionally, the shell can be preheated prior to being taken to the hot press. This step shortens the time required in the hot press to bring the refractory material to the pressing temperature.

The shell 2 is then introduced to the hot press, illustrated generally in FIG. 2.

The body of the hot press 8 is located within a hermetically sealed housing 9. The housing is connected by a conduit 10 to a vacuum pump, not shown, the pump maintains the housing at the desired vacuum pressure, usually less than 1 mm. of mercury and preferably less than 0.1 mm. The vacuum is necessary because at the normal pressing temperatures many of the refractory samples and the press parts themselves would oxidize.

Instead of the vacuum, an inert atmosphere can be maintained within the housing. Thus an inert gas such as helium or argon can be used, or if pressing certain nitrides, a nitrogen atmosphere can be used. The inert atmosphere is also helpful in some cases in preventing the dissociation of the refractory compound being pressed, e.g. nitrogen, used with nitrides, but its use can lead to more heat losses through the walls of the housing since the inert gas is a better heat conductor than the vacuum.

Two rams or plungers 11 and 12 are located with the hot press such that they are coacting in the application of pressure; one ram 11 is located at the bottom of the housing and the other 12 at the top. The rams are used to position the shell 2 within the hot press and also to supply the compacting pressure. The rams are acted on by suitable means, e.g. hydraulic or pneumatic jacks or presses 46 (see FIG. 4) to produce the desired pressure. It is preferred that the rams can be moved independently or simultaneously, and that both rams are movable during the application of pressure. This double action gives a more uniform pressure distribution within the shell than does a single action press, i.e. one stationary ram and one movable ram. However, a single action press can be used satisfactorily for hot pressing thin samples.

An indicator 13 can be attached to each ram to show the amount of ram movement, thus allowing control of the shell's position within the press and indicating the amount of the compaction of the refractory material 1 (illustrated in FIG. 1A and 1B). The ends 4 of the rams which are exposed to the high temperatures of the press are preferably made of graphite.

The pressures applied during the process of the invention generally range from a minimum of about 200 p.s.i. to 10,000 p.s.i., but in the case of operating at lower temperatures, e.g. 1000° C. with molybdenum, pressures up to 30,000 p.s.i. could be used, although these are generally not necessary. The pressure used at the required temperature must be sufficient to compact the material or sample 1 to a density of at least 95% of theory for the refractory composition involved and preferably in excess of 99%. In the most preferred case, the sample will be compressed to a density of 100% of theory.

The body of the hot press 8 is composed of a cylindrical tube 14 having an induction coil 15 around its outer surface. The coil is connected to a suitable source of electrical power, e.g. a spark gap or high frequency generator. The thermal insulation tube 14 is usually made of a nonconducting material such as silica, quartz, or cement bonded asbestos. The annulus of the thermal insulation tube is filled with thermal insulation 16, i.e. carbon black, carbon fibers or cloth, powdered graphite, etc.

This hot press provides heat by induction, which type of heating permits rapid heat up, heating to very high temperatures, good temperature control and rapid and repeated temperature changes. However, depending on press design and other operating characteristics, resistance heating, dielectric heating, heating by hot vapors or gases, or plasma torch heating can also be used. Resistance heating is often economical in use and instead of an induction coil, carbon resistance rods or cylindrical resistance heating units could be used to supply the heat.

In the embodiment employing induction heating, located within the heating tube is a heated susceptor 17. This means acts to heat the loaded shell 2 while it is located in position for the application of pressure. The susceptor is designed such that its position is fixed within the tube 14 and the shell 2 fits within its interior. The susceptor, which is preheated by the induction coil prior to the insertion of the shell provides a rapid heat up and may also provide extra support to the shell 2, if required, when pressure is applied.

In many embodiments the shell will be positioned within a susceptor and spaced therefrom. In this embodiment, the susceptor does not provide lateral support for the shell and the shell is quickly heated solely by radiation. This embodiment is illustrated in FIG. 5 where a shell 2 is positioned within a susceptor 17. The susceptor in this embodiment is also the heating element, and as illustrated is a resistance heater in the form of a cylinder. However, if desired, this embodiment could also use induction heating. The heated susceptor can be made of the same refractory construction materials as the shell, graphite being preferred.

The temperature produced within the press, and that obtained very near the shell can be measured by an optical pyrometer or a radiant pyrometer. A sight lens 18 in the housing 9 can be aligned with a graphite sight tube 19 extending through the heating tube 14 into the heated susceptor 17. Thus the pyrometer can be used to sense the temperature of the heated susceptor 17 very near the material in the shell. The pyrometer used (not shown) should be calibrated against primary standards and against thermocouples positioned in the shell itself so that the actual temperature of the refractory materials 1 can be determined from their readings.

Automatic temperature control is possible with the information obtained from the radiant pyrometer; the information being used to regulate the power input into the coil 15. Automatic control is also possible using thermocouples as the sensing device, but the pyrometers have a much longer useful life at temperatures above 1500° C.

The temperatures produced generally range from about 500° C. to 2500° C., and under most operating conditions a temperature of at least 1000° C. is required to fabricate true refractory materials to high density. The materials of construction of the hot press generally impose a maximum temperature of about 2500° C., since above this temperature most of the materials used lack sufficient strength.

To load the hot press, the loaded shell 2 can be placed on a suitable conveyor 21, a roller conveyor as illustrated in FIG. 2, and either introduced directly into the hot press housing 9 and subsequently evacuating the housing, or it can be introduced through a suitable air lock 20 into the hot press housing, the housing being continually maintained with an oxygen free atmosphere. The air lock 20 can have sliding valves which are operated by automatically controlled pneumatic cylinders.

In other embodiments, not illustrated, instead of roller conveyors, a mechanically rotating round table could be used to transport the shells 2 within the housing. For example, a round table, having a plurality of holes to hold the shells, would be located below the hot press body. The table would be rotated by mechanical means and would have positioning means to stop rotation once a shell is located over the bottom ram. Or a sprocket and chain drive could be used. The chain would have mechanical means to secure and move the shell along a raceway to the pressing position. The chain would be driven by an electric motor linked to a sprocket on one end. The sample can also be propelled along parallel tracks or a trough by means of horizontal pushers or rams.

During movement by the conveying devices set forth above, various mechanical means can be used to secure the shell, such as a shell holder 38 (see FIG. 4). This holder 38, has a cavity in which the loaded shell 2 with pistons 7 (see FIG. 1A) is placed; the shell being supported on a recessed ledge 39 in the cavity. In another aspect, the cavity of the shell holder could have a diameter such that the smaller portion 34 of the piston (see FIG. 1A) would extend through but the larger portion would be retained by the recessed ledge 39. If this embodiment is used, there would not be any need in the lower piston for the pin 36 and slot 37 arrangement or the rib 35 (see FIG. 1A).

The holder is mounted on and is moved by or on the conveyor used, e.g. belt, rollers, chain, etc. The holder is transported until the shell containing cavity is aligned with the positioning rams. The bottom ram will then move through the cavity, engage the piston 7 and raise the shell and piston assembly into the heated susceptor 17.

Once within the housing, the shell can be preheated in a preheater (not shown in FIG. 2) or placed directly into the hot press. In loading the hot press illustrated in FIG. 2, the roller conveyor 21 moves the shell forward until the initial shell is located between the two movable pressing rams 11 and 12, i.e. until it is located over the bottom ram 11. At this time, the bottom ram is manipulated to position the shell in the thick-walled heated susceptor 17. The top ram 12 can also be used to assist in locating the shell 2 in the desired position within the heated susceptor 17. The indicators 13 inform the operator when the desired placement has been obtained.

In some applications wherein larger and heavier loaded shells are involved, it may be desirable to provide means to position and support the shell 2 within the heated susceptor 17 that are independent of the rams 11 and 12 and pistons 7. Thus movable hollow tubes or shell positioners (not shown) made of a suitable refractory material, can be located such that they are concentric with and surround the rams. These tubes would have a diameter such that they only engage the shell, not the pistons. Thus these tubes will move independent of the rams either by spring action or by other means and position the loaded shell within the hot press, and once positioned and heated, the rams will move within the tubes and apply the compacting pressure. This embodiment would be particularly useful when shell containers 5 containing a plurality of loaded shells are used.

An embodiment attaching the hollow tube or shell positioner to the ram by means of springs is shown in FIG. 5. Thus, the tube, 47, supports the shell 2 while the end of the ram 11 supports the piston 7. A similar arrangement can be used on the top ram, or, more simply, a separately mounted tube support, 48, can be used as a stop against which the top edge of shell 2 is held by the force of the springs 49 pushing the bottom tube 47 upward against the bottom edge of the shell 2. With the shell and contents so positioned in the susceptor, pressure can be applied to the pistons 7 by the rams 11 and 12. Upper ram 12 can move freely within the fixed cylindrical stop 48. Ram 11 can move the limited distance necessary to compact the sample; during the compaction the tube 47 around ram 11 remains fixed, but the springs 49 are compressed.

Once in place, due to the fact that the susceptor 17 has been preheated, the shell 2 and refractory material 1 therein are rapidly brought up to the pressing temperature. Pressure is then applied by the rams 11 and 12 to achieve the desired compaction. The optimum temperatures, pressures, sequence of application and times of application can be selected for each individual material to be pressed.

If a shell container 5 containing a plurality of individual shells is used, as illustrated in FIG. 1C, the container 5 can be handled the same as the individual shells 2. The rams 11 and 12 would be designed so that they would simultaneously apply the same pressure to each of the pistons 7.

Upon completion of the desired pressing program, the shell 2 containing the compacted material is ejected from the heated susceptor 17 through manipulation of the rams 11 and 12 and it immediately starts to cool. The shell can easily be removed from the susceptor since the shell does not contact the susceptor.

After the ejection of the thin-walled shells, the hot susceptor 17 is ready to receive the next loaded shell for another pressing. No time is lost heating or cooling between pressings.

If desired, the compacted material can be ejected from the shell 2 while it is still hot. Whether hot or cold ejection of the material is used is optional, depending upon the particular material compacted.

Thus for hot ejection, after the hot pressing and removal from the hot press susceptor 17, the loaded shell would be placed on the shell holder 38. The rams would continue their movement such that the pistons 7, plugs 6, and compacted material are ejected from the shell, which is supported by the recessed ledge 39 in holder cavity. The shell assembly and compacted material would then be cooled in an oxygen free environment.

If the cavity of the holder 38 was such to restrain further movement of the larger portion 34 of the pistor as previously described, the holder could have two interconnected cavities (not shown). One of the cavities would have a larger diameter such that it would support the shell 2 but not the larger portion of the piston. In operation the loaded shell would be placed in the smaller cavity prior to pressing, and afterwards, the rams would place it on the larger cavity; the conveyor 21 having moved the holder during the pressing cycle. The rams would then push the pistons, plugs and compacted material out the larger cavity, while the shell is being supported by the recessed ledge of this cavity.

If hot ejection of the sample from the shell is not used, the shells containing the pressed material are placed on the conveyor 21 and transferred to a cooling zone 23 maintained within the hot press housing. The cooling zone also has an oxygen free atmosphere. The initial shell is cooled within the chamber 23 while the next shell is being pressed. After cooling, the shell is moved to the second automatically controlled, pneumatic air lock 24 and then it is discharged from the vacuum atmosphere maintained within the press. A suitable ram can then be used to remove the compacted material from the shell.

Instead of a fixed, one-piece heated susceptor 17, the susceptor can be sectioned into two or more parts 33 and these may be attached to double acting horizontal, pneumatic pistons 22 as illustrated in FIG. 3. Pressure can be supplied through the horizontal pistons to support the shell 2 from the pressure applied through the vertical rams 11 and 12 in compressing the sample. This system is of advantage where higher compacting pressures (above 4000 p.s.i.) are required.

In operation the shell is introduced and removed from the susceptor assembly with the susceptor sections 33 in the open position. Each section moves a short distance, e.g. ½ inch, from the open position to the closed position by means of the double acting pneumatic rams 22. During heating and pressing, positive support is provided to the shell 2 by the susceptor sections 33 being closed tightly around the shell 2.

After the pressing has been completed the horizontal pistons 22 can then be backed off, opening the sections 33 to permit easy release of the shell 2. Such a procedure results in minimum wear on the parts.

It is also possible to reduce wear on the shell by using a fixed, pressure-fitted liner of a refractory material. As wear develops, it is then possible to replace only the fixed liner.

On a large scale operation it is advantageous to enclose the whole operation by using interconnected chambers which are filled with an oxygen free atmosphere and contain ports with rubber gloves through which operators can carry out manipulations, see FIG. 4. The unloaded shell 2 with the bottom piston 7 and plug 6 in place is introduced into air lock 31 and placed on shell holder 38. The shell is introduced while sliding valve 40 is opened and sliding valve 41 is closed. After the shell is inside the air lock, sliding valve 40 is closed and the air in the chamber is displaced by an inert gas. The shell is loaded with powdered refractory material from the loading meter 25. The loading is done by a man standing outside the chamber with his hands in rubber gloves which extend into the chamber. The chamber is then evacuated. The sliding valve 41 is then opened and the loaded shell 2 on the shell holder 38 is moved to the preheater 27. The preheater, e.g. an induction coil, is moved down to enclose the shell by hydraulic cylinder 42. Alternatively, means could be used to raise the loaded shell into a fixed heater and subsequently lower it.

After preheating, the shell is moved into the hot press 28 by the rams 11 and 12. While in the press the refractory material 1 to be compacted, is subjected to heat and pressure to obtain the desired density, 99% to 100% of theoretical. After the hot-pressing cycle is completed, the loaded shell 2 is removed from the heated susceptor 17 by the combined action of the two rams and placed on the shell holder 38. The shell 2 is then moved by the conveyor 21 until it is positioned under the cooler 23. The cooler can be a series of copper tubes through which cold water is running. The cooler 23 can be lowered and raised from the shell through the action of hydraulic cylinder 43. The next shell is then moved into position on the ram center line and pressed in the same manner. No additional susceptor heating or cooling time is required between cycles.

Upon completion of the cooling, sliding valve 44 is opened and the shell is moved into the previously evacuated exit lock 32. Sliding valve 44 is closed and the pressure in the exit lock 32 is allowed to increase to atmospheric. Exit lock 45 is then opened and the shell is removed from the hot press.

The pressed refractory material 1 is then removed from the shell 2 by a suitable hydraulic or pneumatic ram (not shown) and the shells are returned to the air lock 31 for reuse. If desired, the ram used to remove this material from the shell can be located within the housing, however, this is not necessary.

The figures and specifications have heretofore disclosed hot pressing which can be described as operating in a vertical fashion, i.e. the rams moving in a vertical direction. The invention is not so limited, and can be performed with apparatus operating on a horizontal plane with minor changes.

For example, the rams could be movable in a horizontal plane and the shells moved through the housing in a direction parallel to the axis of the rams. The shells would be placed on a suitable conveyor such that the axis of the pistons would be parallel to the axis of the rams. Suitable positioning means could be used to individually transfer a shell assembly from the conveyor and align it with the rams. The rams would then transfer the shell assembly horizontally into the heated susceptor for the compacting operation. After the pressing cycle is over, the rams would remove the shell from the support and place it where the positioning means would transfer it back to the conveyor for transport to the cooling and unloading zones.

The amount of pressure and temperature applied and the period of time of the application is very important in the hot pressing of refractory materials. It is known in the art that grain size is a very important factor in determining physical properties of refractory compacts; small grain size is highly desirable because it leads to high values of physical properties, particularly strength and hardness. The use of heat is essential to produce dense, coherent bodies, however, exposure to high temperatures for long times during fabrication promotes grain growth, and samples heated under pressure have higher grain growth than those not under pressure at the same temperature. With some refractory powders having very fine particle size the best results have often been obtained by raising the temperature vary rapidly, applying the pressure late in the cycle and holding it at the minimum temperature for minimum time necessary to get complete density. The process of the invention is of particular advantage when used with these very fine particles since the process enables the particles to be held at the high temperature for only a short period of time, thus allowing compaction without undue grain growth.

For other materials, a short hold period at maximum temperature may be desirable to permit outgasing, sintering and elimination of the largest pores before final compression. In other cases, it is preferable to apply pressure early in the cycle. In all cases, it is clear that conditions of temperature, pressure and time are critical, they vary for each refractory material, and must be regulated precisely, and very quickly. The subject process permits this control to be accomplished as precise and rapid as needed, thus resulting in superior products in a much shorter processing time than heretofore possible.

In the subject processes, fast heat up can be obtained by injecting the refractory material to be compacted and the reuseable shell (which may be partially preheated) into a hot susceptor to allow the refractory sample to heat rapidly to final temperature through radiation or conduction. The sample is held at temperature only long enough for desired compaction to take place. Ejection of the loaded shell from the hot zone allows rapid cool down of only the small mass accompanying the sample, and this is done without holding up pressing of the next sample. When combined, these steps allow fast efficient production of fine-grained, hot-pressed bodies that are very strong and hard.

In an exemplary operation of the process of the invention, the following steps are performed:

Reference is made to FIG. 1 in connection with the description of the loading of the shell and to FIG. 2 for the hot-pressing operation.

The shell 2 used is cylindrical, having an inside diameter of 1 inch, outside diameter of 1½ inches, and a length of 4 inches. The discs 6 are ¼ inch in thickness and 1 inch in diameter and the pistons 7 are 1 inch in diameter and 2 inches long. Twenty grams of a powder comprising a commercial α-alumina with an average particle size of 0.3 micron is loaded into the shell 2 as follows:

(1) The bottom separation disc 6 is placed into the loading shell 2.

(2) The bottom piston 7 is put into the loading shell touching the bottom separation disc.

(3) The bottom piston and disc are pushed up into the shell about 1½ inches.

(4) The twenty grams of the powder is poured into the top end of the shell.

(5) The powder is loaded uniformly into the shell. This is accomplished by tapping the outside of the shell while it is being rotated.

(6) The top separation disc 6 is placed on top of the loaded powder.

(7) The top piston 7 is placed in contact with the top separation disc.

(8) The piston, separator, and powder assembly is moved until the powder is centered in the shell or both top and bottom pistons extend equal lengths out from the shell.

(9) A loading pressure of 200 p.s.i. is applied to consolidate the assembly.

The shell assembly is then placed into a holder and onto the roller conveyor 21 in the air lock 20 of the hot press. The air lock is evacuated and the shell transported into the hot press housing. The roller conveyor transports the shell until it has positioned the shell on the center line of the rams 11 and 12, for pick up by the rams.

The graphite susceptor 17 has been preheated by induction to 1000° C. The loaded shell assembly, in line with the pressure rams, is then held between the pressure rams with a minimum pressure (about 200 p.s.i.) and moved into the cavity in the hot susceptor. It takes about three minutes of radiation for the shell assembly to reach the temperature of the susceptor. After this period, 4000 p.s.i. is applied to the powder 1 within the shell through the pressure rams and pistons. More heat is applied by induction to heat the sample to 1500° C. in about five minutes. It is held at that temperature for five minutes while the 4000 p.s.i. is maintained.

The heating is then stopped, the pressure released and the shell immediately moved out of the susceptor, again while being held between the pressure rams with a light pressure. It is placed back in the holder and moved away from the center line of the rams. The shell cools down in the cooling chamber 23 while subsequent shells are being pressed in the same manner.

When the shell has cooled, it is transported out of the hot press housing through air lock 24. The compacted material is pushed out of the loading shell with a small hydraulic ram. The powder has been pressed into a strong, hard, non-porous, completely dense refractory body and the shell is suitable for reuse.

In another exemplary operation, the following steps are performed. Reference is made to FIG. 1 in connection with the description of the loading of the shell and to FIG. 5 for the hot pressing operation.

The shell 2 used is cylindrical, having an inside diameter of 3 inches, outside diameter of 5 inches, and a length of 8 inches. The discs 6 are ¼ inch in thickness and 3 inches in diameter, and the pistons 7 are 3 inches in diameter and 4 inches long. Two hundred ninety grams of a powder comprising a commercial α-alumina with an average particle size of 0.3 micron is loaded into a shell 2 as follows:

(1) The bottom separation disc 6 is placed into the loading shell 2.

(2) The bottom piston 7 is put into the loading shell touching the bottom separation disc.

(3) The bottom piston and disc are pushed up into the shell about 1½ inches.

(4) The 290 grams of powder is poured into the top end of the shell.

(5) The powder is loaded uniformly into the shell. This is accomplished by tapping the outside of the shell while it is being rotated.

(6) The top separation disc 6 is placed on top of the loaded powder.

(7) The top piston 7 is placed in contact with the top separation disc.

(8) The piston, separator, and powder assembly is moved until the powder is centered in the shell or both top and bottom pistons extend equal lengths out from the shell.

(9) A loading pressure of 200 p.s.i. is applied to consolidate the assembly.

The shell assembly is then placed into a holder and onto a roller conveyor 21 in the air lock 20 of the hot press. The air lock is evacuated and the shell transported into the hot press housing. The roller conveyor transports the shell until it has positioned the shell on the center line of lower ram 11 for pick-up by the rams.

The susceptor 17 is a resistance heater and has been preheated to 1000° C. The loaded shell assembly, in line with the lower pressure ram, is then raised into the hot susceptor, the shell supported by tube 47 and the piston 7 supported by the lower pressure ram. The tube and lower pressure ram continue to raise the shell into the susceptor until the shell contacts and is restrained by the fixed cylindrical support 48. A minimum pressure (about 200 p.s.i.) is then applied by the upper pressure ram 12 and lower pressure ram 11 to the pistons 7. Spring 49 is compressed allowing the lower pressure ram 11 to penetrate concentric tube 47. It takes about three minutes for the shell assembly to reach the temperature of the susceptor. After this period, 4000 p.s.i. is applied to the powder 1 within the shell through the pressure rams and pistons. More heat is applied by resistance to heat the sample to 1500° C. in about five minutes. It is held at that temperature for five minutes while the 4000 p.s.i. is maintained. The heating is then stopped, the pressure released and the shell immediately moved out of the susceptor, again while being supported by the tube 47 as the lower pressure ram withdraws downward through the tube, allowing spring 49 to extend. The shell is then placed back in the holder and moved away from the center line of the rams. The shell cools down in the cooling chamber 23 while subsequent shells are being pressed in the same manner.

When the shell has cooled, it is transported out of the hot press housing through air lock 24. The compacted material is pushed out of the loading shell with a small hydraulic ram. The powder has been pressed into a strong, hard, non-porous, completely dense refractory body, and the shell is suitable for reuse.

The process of the invention can be varied to accommodate different pressing conditions. Thus if it is desirable to reach a temperature equilibrium prior to the application of any pressure, the following changes would be taken with respect to the exemplary operation. First, no initial compacting pressure of 200 p.s.i. would be applied and the top ram 12 would not be used during the positioning of the shell within the hot press support 17. Thus no pressure would be applied to the refractory material prior to reaching temperature equilibrium at the maximum desired temperature. The full pressure could then be applied rapidly and held for the minimum time to achieve density.

The bodies made by the process of the invention have many uses wherever hard, strong, high temperature resistant materials are required, e.g. cutting tool tips, dies, drills, gage blocks, valve seats, etc.

I claim:
1. A rapid, repetitive, hot pressing process for compacting refractory materials comprising:
   (a) confining said refractory material in reusable shells,
   (b) introducing said shells into a housing containing an atmosphere essentially free from oxygen,
   (c) positioning in a repetitive sequence said shells into a preheated susceptor,
   (d) heating said shells to a temperature between about 500° C. and 2500° C. while in said atmosphere essentially free from oxygen,
   (e) applying a pressure between 200 to 30,000 pounds per square inch to the refractory material within said shells until said material is compacted to at least 95% of theoretical density,
   (f) releasing said pressure and immediately withdrawing in sequence said shells from said susceptor before the compacted material has had a chance to cool substantially and in either order,
   (g) rapidly cooling said shells and compacted material in an atmosphere essentially free from oxygen and removing said material from said shells.
2. The process of claim 1 wherein the material compacted is tungsten carbide interdispersed with cobalt.
3. The process of claim 1 wherein the heating is between 500° C. and 2000° C. and the pressure is between 200 and 10,000 pounds per square inch.
4. The process of claim 1 wherein the atmosphere essentially free from oxygen is a vacuum.
5. The process of claim 1 wherein the refractory material is confined in a plurality of separate layers in the shell.

References Cited
UNITED STATES PATENTS

| | | | |
|---|---|---|---|
| 2,167,544 | 7/1939 | De Bats | 75—137 |
| 2,990,602 | 7/1961 | Brandmayr | 264—125 X |
| 3,264,388 | 8/1966 | Roach | 264—125 |
| 3,294,878 | 12/1966 | Carnall | 264—85 X |
| 3,340,270 | 9/1967 | King | 264—332 X |

ROBERT F. WHITE, *Primary Examiner.*

R. R. KUCIA, *Assistant Examiner.*